United States Patent [19]
Ejk et al.

[11] 4,345,046
[45] Aug. 17, 1982

[54] CALENDERING OF POLYOLEFINS

[75] Inventors: Adam J. Ejk, Piscataway; Donald J. Krzywicki, Hopewell, both of N.J.

[73] Assignee: Tenneco Chemicals, Inc., Piscataway, N.J.

[21] Appl. No.: 270,757

[22] Filed: Jun. 5, 1981

[51] Int. Cl.$^3$ .......... C08J 3/18; C08K 5/09; C08K 5/20

[52] U.S. Cl. .......... 524/223; 264/175; 425/DIG. 235; 524/224; 524/320; 524/322; 524/394; 524/399; 524/400; 524/570; 524/583

[58] Field of Search .......... 260/23 H; 264/175; 425/DIG. 235

[56] References Cited

U.S. PATENT DOCUMENTS

| | | | |
|---|---|---|---|
| 2,462,331 | 2/1949 | Myers | 260/23 H |
| 2,860,115 | 11/1958 | Hecker et al. | 260/23 H |
| 3,007,207 | 11/1961 | Salhofer | 264/175 |
| 3,231,541 | 1/1966 | Caldo | 260/23 H |
| 3,239,484 | 3/1966 | Stark | 260/23 H |
| 3,248,351 | 4/1966 | Ray | 260/23 H |
| 3,328,503 | 6/1967 | Ancker | 264/175 |
| 3,790,517 | 2/1974 | Koizumi et al. | 260/23 H |
| 4,144,304 | 3/1979 | Dereppe et al. | 260/17.4 R |
| 4,251,407 | 2/1981 | Schroeder et al. | 260/23 R |

FOREIGN PATENT DOCUMENTS

| | | | |
|---|---|---|---|
| 610894 | 12/1960 | Canada | 260/23 H |
| 42-788 | 1/1967 | Japan | 260/23 H |
| 49-11462 | 3/1974 | Japan | 260/23 H |
| 842761 | 7/1960 | United Kingdom | 260/23 H |

*Primary Examiner*—Ronald W. Griffin
*Attorney, Agent, or Firm*—Evelyn Berlow

[57] ABSTRACT

A lubricant composition for processing polyolefin resins is disclosed. The lubricant composition comprises a mixture of from about 60 to 70 parts by weight of an N,N'-ethylenebis amide of a fatty acid or hydroxy-substituted fatty acid, from about 22 to about 32 parts by weight of a free fatty acid or hydroxy-substituted fatty acid, and from about 3 to about 13 parts by weight of a metal salt of a fatty acid or hydroxy-substituted fatty acid. The lubricant composition is particularly useful in the calendering of polypropylene homopolymers and copolymers.

30 Claims, No Drawings

CALENDERING OF POLYOLEFINS

BACKGROUND OF THE INVENTION

1. Field of the Invention

This invention relates to the continuous manufacture of films and sheets of polyolefins, especially polypropylene, by means of calendering, i.e. by squeezing a mass of heat-softened thermoplastic polyolefin between two or more heated, horizontal, parallel rollers.

The process of calendering was originally developed in the rubber industry for the continuous manufacture of natural and synthetic rubber sheeting, and was later adapted to the manufacture of films and sheets of synthetic thermoplastics such as vinyl chloride homopolymers and copolymers, cellulose acetate, and, to a limited extent, polyethylene and other polyolefins. In the case of polyolefins, and of polypropylene in particular, the overwhelming preponderance of film and sheeting is manufactured by processes other than calendering, such as casting, blow extrusion (for film, having a thickness of 10 mils and under), and flat-die extrusion (for sheet, having a thickness of over 10 mils). As used herein the term polypropylene includes both homopolymers and random and block copolymers of propylene and another olefin such as ethylene or butene-1.

Since its commercial introduction in 1958 polypropylene, especially highly isotactic polypropylene, has had a rapid growth rate and is presently produced at an annual rate of almost four billion pounds, due to a combination of raw material availability, low cost, low specific gravity, and many desirable chemical and physical properties. Among the latter can be mentioned: resistance to many solvents, clarity and gloss, ability to be colored, ability to be electroplated and vacuum metallized, high tensile yield strength, stiffness, relatively high heat distortion, temperature, heat resistance, and excellent resistance to environmental stress cracking. Of the approximately four billion pounds made annually, more than three hundred million pounds per year are converted to film and sheet, with the balance being mainly injection molded or extruded into fibers, pipe, and other profiles. The film and sheet is used for a variety of purposes, which include: bread wrap and other food packaging applications, including boilable food pouches; appliance housings; various automotive applications such as kick panels, instrument panels, and trim; and numerous others. Although various disclosures have been made of the manufacture of polypropylene film and sheeting by means of calendering, this process has not achieved any substantial commercial success despite the fact that it does have potential advantages over blow extrusion and flat-die extrusion. One such advantage is the fact that during production runs color changes can be made easily without extensive clean-out of the equipment. Another advantage is that calendering can provide better control of thickness variation across the width of the sheet as compared with flat-die extrusion.

A major problem which has held back the calendering of polypropylene on a large scale is the tendency of this polymer, which has a relatively sharp melting point, to stick tenaciously to the calender roll surfaces. This makes it difficult or impossible to strip the film or sheet from the last roll at a temperature high enough to retain the desired surface smoothness. Although some limited success has been achieved in producing a smooth sheet of polypropylene on a calender, it was done at such a low production rate due to the lack of a suitable lubricant for the polymer as to make the process economically unacceptable. Increasing the production rate resulted in a sheet totally lacking in surface smoothness. In varying degrees, the same problems occur with other polyolefins.

Because of the combination of chemical and physical properties possessed by propylene homopolymers and copolymers as previously mentioned, these materials are potentially uniquely suitable for the manufacture of containers (trays, blisters, tubs, cups, and lids, by way of examples), especially containers for packaging food and drug products, by means of thermoforming, and especially vacuum forming. The lack of polypropylene sheets having uniform thickness, smooth surfaces, and good clarity has thus far hampered the fulfillment of this potential.

It is an objective of this invention to overcome the problems encountered in calendering polypropylene and other polyolefins through the use of a novel combination of lubricants which is incorporated into the polymer to be calendered.

2. Description of the Prior Art

U.S. Pat. No. 2,462,331 discloses a calenderable composition comprising polyethylene and, as a lubricant, a polyhydric alcohol ester of, or a metal salt of, a monocarboxylic fatty acid having from 12 to 24 carbon atoms.

U.S. Pat. No. 3,007,207 discloses a process for calendering crystalline organic polymers, including polyethylene and polypropylene. The polymer composition being calendered can contain an antioxidant.

U.S. Pat. No. 3,176,021 discloses a process for melt extruding a composition comprising polypropylene and an amide of a water-insoluble monocarboxylic acid having from 8 to 18 carbon atoms.

U.S. Pat. No. 3,184,526 discloses a process for producing self-supporting films of solid polyolefins, including polyethylene and polypropylene, using a pair of closely spaced rotating rolls. The composition used to form the films comprises fine particles of polyolefin wet with an inert organic diluent.

U.S. Pat. No. 3,248,351 discloses a process for improving the color of polyolefins, including polyethylene and polypropylene, by mixing polyolefin wet with methanol with the zinc salt of a monocarboxylic acid having 1 to 12 carbon atoms and with an oxidation stabilizing compound.

U.S. Pat. No. 3,320,334 discloses polyolefin compositions rendered dyereceptive by having incorporated into the polyolefin a pyridinic polyamide poly-condensation product of isocinchomeronic acid or its esters with an aliphatic diamine. Suitable polyolefins include polyethylene and polypropylene.

U.S. Pat. No. 3,328,503 discloses a process for forming oriented crystalline thermoplastic film and sheeting which comprises passing a preformed web of molten amorphous polymer through the nip of a pair of counter-rotating rolls without forming a bank at the ingress side. The apparatus used can be a calender, and the polymer can be polyethylene or polypropylene. A combination of calcium stearate, stearic acid, and dibutylparacresol is disclosed as a calendering aid for polyethylene.

U.S. Pat. No. 4,144,304 discloses a process for calendering polyolefins, including polyethylene and polypropylene, wherein the polyolefin is admixed with vegetable fibers. The presence of vegetable fibers prevents the mixture from sticking to the calender rolls. The mixture can also contain a lubricant, such as calcium stearate.

U.S. Pat. No. 4,251,407 discloses the use of zinc oxide as an anti-corrosive additive in polypropylene compositions which contain a fatty acid salt, such as calcium stearate, as an acid acceptor.

A discussion of the problem of surface irregularities of calendered polypropylene was presented by Prentice, in *Polymer*, 1981, Vol. 22 p. 250-4.

SUMMARY OF THE INVENTION

This invention provides a novel, three-component lubricant composition for polyolefins, especially homopolymers of propylene and random or block copolymers of propylene and at least one other olefin such as ethylene or butene-1. It also provides calendered films and sheets of said polyolefins, made possible by the inclusion in the polyolefin composition to be calendered of the novel three-component lubricant system. The use of this lubricant system enables polyolefin compositions to be calendered by conventional techniques on conventional calenders, and at commercially-acceptable rates of speed. Any of the known calenders usually employed for the manufacture of thermoplastic films and sheets are suitable in the practice of this invention, including, but not limited to, 3-roll and 4-roll calenders having various configurations such as stacked "L," inverted "L," "Z," and inclined "Z."

The lubricant composition of this invention can be incorporated into polyolefin polymers by any of the conventional methods known in the art for incorporating additives into these polymers and by using any of the apparatus conventionally used for such a purpose. The polyolefin polymer containing the novel lubricant can also contain other additives conventionally used, such as anticorrosive additives, acid acceptors, heat stabilizers, light stabilizers, antioxidants, antistatic agents, fillers, colorants, and so forth.

Polyolefin compositions containing the lubricant combination of this invention can be calendered into sheets and films using conventional apparatus and methods. Although these polyolefin compositions, and especially polypropylene compositions, are particularly suitable for calendering, they can also be used if desired to fabricate sheets, films, profiles, filaments and so on by other methods, including extrusion, flat-die extrusion, blow extrusion, and injection molding, by way of examples.

DETAILED DESCRIPTION OF THE INVENTION

It has been found that the objects of this invention can be achieved by using as a lubricant for polyolefins a composition comprising from about 60 to about 70 parts by weight of at least one N,N'-ethylenebis amide of a fatty acid, or hydroxy-substituted fatty acid, having from about 10 to about 22 carbon atoms; from about 22 to about 32 parts by weight of at least one free fatty acid, or hydroxy-substituted fatty acid having from about 10 to about 22 carbon atoms; and from about 3 to about 13 parts by weight of at least one metal salt of a fatty acid or hydroxy-substituted fatty acid having from about 10 to about 22 carbon atoms.

Examples of fatty acids and hydroxy-substituted fatty acids which can be used in the practice of this invention, for preparing the N,N'-ethylenebis amide, as the free acid, and for preparing the metal salt, are capric, lauric, myristic, palmitic, margaric, stearic, arachidic, behenic, 12-hydroxystearic, 2,3-dihydroxystearic, and 9,10-dihydroxystearic. For each component of the lubricant composition, a single acid or a mixture of two or more can be used. Either highly purified grades or technical grades of the acids can be used, with technical grades being preferred because of lower cost. The preferred fatty acid is stearic acid, and the preferred hydroxy-substituted fatty acid is 12-hydroxystearic acid.

A single N,N'-ethylenebis amide is generally used, but mixtures of two or more can be used if desired without departing from the scope of this invention.

The metal salt component is preferably a fatty acid or hydroxy-substituted fatty acid salt of a bi-valent metal, especially a fatty acid salt of barium or zinc. Zinc salts are particularly preferred because they frequently assist in preventing the development of color during thermal processing of the polymer, in addition to improving lubricity of the polymer. The most preferred fatty acid salt is zinc stearate. A single metal salt component is generally used, although mixtures of two or more can be used if desired without departing from the scope of this invention. In some cases, depending on the particular polyolefin or mixture of polyolefins employed, it may be found advantageous to use a mixture of two or more metal salts since the mixture may perform synergistically with regard to improving lubricity. Other metal salts which can be used include those of cadmium, calcium, strontium, magnesium, tin, aluminum, antimony, lead, zirconium, potassium, sodium, and indium.

A particularly preferred lubricant composition, especially suitable for calendering polypropylene and propylene copolymers, comprises about 65 parts by weight of N,N'-ethylenebis (stearamide), about 27 parts by weight of stearic acid, and about 8 parts by weight of zinc stearate.

The amount of the novel lubricant composition to be used will generally vary over a range of from about 0.1 parts by weight to about 5 parts per weight per 100 parts by weight of polyolefin. Those skilled in the art will understand that the optimum level of lubricant will vary, depending on a variety of factors including the nature of the polyolefin and its molecular weight, the thickness of film or sheet being calendered or otherwise processed, and the temperature and speed of the calender or other processing equipment, and will be able to readily determine the optimum level with only a minimum of routine experimentation. The level of lubricant used can be outside the range of 0.1-5 parts by weight per 100 parts by weight (PHR) of polymer without departing from the scope of the invention, but smaller amounts will usually be ineffective and larger amounts may not provide benefits commensurate with the increased cost or may even be detrimental by providing too much lubricity. The preferred level of lubricant, especially for use in calendering propylene homopolymers and copolymers, is in the range of from about 0.5 to 1 PHR.

The components which comprise the novel lubricant system can be added individually to the polyolefin to be lubricated if desired, but it is preferred that they first be blended together to form a homogeneous mixture and then added to the polyolefin. The mixture can conveniently be prepared by having the individual components in the form of fine powders, and blending them at room temperature, using a ribbon blender or any other suitable piece of equipment conventionally used for such a purpose. If desired, the components can be mixed together in molten form and either added as a melt to the polyolefin, or cooled to a solid form first and granulated or pulverized before use.

The polyolefin resins which are useful in practicing this invention are relatively high molecular weight, crystalline or partially crystalline, polymers having high tensile strength and generally good mechanical properties. Polypropylene resins, which are preferred, have average molecular weights in the range of about 80,000. Also preferred are copolymers of propylene and other olefins, particularly copolymers of propylene and ethylene which contain from about 3% to 20% ethylene mers. Suitable polyolefin resins are commercially available in a wide variety of molecular weight, degree of crystallinity, and copolymer type and monomer ratios. Such resins are most frequently supplied in the form of pellets, having average diameters of about ⅛ inch. Although a single polyolefin resin will usually be used in the practice of this invention, a mixture of two or more of differing molecular weight, degree of crystallinity, or composition can be used without departing from the scope of the invention.

In order to calender polyolefin resins employing the novel lubricant composition disclosed herein, it is necessary to first prepare an intimate mixture of the resin and lubricant composition. This can be done using techniques and apparatus conventional in the art. For example, the resin pellets can be dusted with the desired amount of finely pulverized lubricant composition and then fluxed and masticated in any suitable piece of equipment, such as a Banbury ® mixer or a 2-roll mill, heated to a temperature sufficient to melt the crystalline portions, or crystallites, of the resin until the lubricant is uniformly distributed in the molten or sem-molten resin.

Those skilled in the art will be aware that in calendering polyolefins the surface temperature of the calender rolls will vary depending on a number of factors, and that the temperatures of different rolls of the calender will usually be held at different levels for optimum results. Included in the factors which dictate the roll temperature to be used are chemical type of the resin, molecular weight of the resin, and thickness of the film or sheet being produced. The determination of optimum temperatures, roll speeds, and friction ratios is an ordinary skill of a calender operator. The optimum conditions will be those whereby the resin composition is maintained at a temperature above its crystallite melting point while it is passing through the calender, and whereby a smooth rolling bank of resin composition is formed and maintained at each nip of the calender rolls. Obviously, the temperature should not be so high that the resin is thermally degraded, or so high that the film or sheet is too soft and weak to be taken off the last calender roll without deforming or tearing; nor should it be so low that crystallites form prematurely, before the film or sheet is taken from the last calender roll, which can produce a rough surface in the finished film or sheet.

Of the following examples, some of which are comparative examples and some of which are according to the present invention, those according to the invention are illustrative thereof but not limitative thereof. In each of the examples, all amounts shown are parts by weight.

COMPARATIVE EXAMPLE A

Individual lubricants were evaluated in polypropylene by charging 150 grams of Shell Polypropylene DP5071 and 3.0 grams of lubricant to a laboratory 8"×16" two-roll mill having its roll surface temperature maintained at 380° F. The resulting mixtures were thoroughly blended, and rated qualitatively for the ease or difficulty with which the sheet of polypropylene could be stripped from the mill roll. The following table summarizes the results.

| Lubricant | Roll Release |
|---|---|
| petrolatum | stuck |
| poly(butyl acrylate) | poor, stuck |
| N,N'-ethylenebis(stearamide) | good |
| calcium stearate | fair → |
| barium stearate | good |
| lauric acid | good |
| stearic acid | good |
| 12-hydroxystearic acid | excellent (poor early color hold) |
| polyethylene wax | poor |
| montan wax ester | poor |
| glyceryl monostearate | good |
| N,N'-ethylenebis(hydroxystearamide) | good |
| erucamide | stuck |
| oleylpalmitamide | stuck |
| stearylerucamide | stuck |
| oxidized polyethylene | poor |

COMPARATIVE EXAMPLE B

Following the procedure used in Example A, two-component combinations of those lubricants rated "good" were evaluated. The best results, rated as excellent, were obtained with combinations of about 70% by weight of N,N'-ethylenebis(stearamide) and 30% by weight of either lauric acid or stearic acid. The polypropylene sheet released easily from the mill roll, although the color of the sheet was poor. The optimum level of the 70/30 lubricant mixture was found to be about 0.5 parts by weight per 100 parts by weight (PHR) of polypropylene.

COMPARATIVE EXAMPLE C

Using a lubricant combination consisting of about 70% by weight of N,N'-ethylenebis(stearamide) and 30% by weight of lauric acid, calendering tests were made on an 8"×16" four-roll inclined "Z" laboratory calender. For each run, 1050 grams of Shell Polypropylene DP5071 was dusted with a weighed amount of the lubricant composition and charged to a size BR Banbury ® mixer. The masticated charge was dropped from the Banbury ® mixer at 375°–380° F. and fed directly to the calender. A few preliminary experiments were made to establish that a lubricant level of 1.0 PHR was optimum, and this level was used for the following runs:

| Run | Thickness, Mils | Roll Speeds,ft/min. | | | | Roll Temp., °F. | | | |
|---|---|---|---|---|---|---|---|---|---|
| | | 1 | 2 | 3 | 4 | 1 | 2 | 3 | 4 |
| 1 | 6.0–7.0 | 6 | 8 | 12 | 15 | 370 | 340 | 335 | 300 |
| 2 | 6.0–6.5 | 6 | 8 | 12 | 15 | 370 | 340 | 335 | 300 |
| 3 | 5.5–6.0 | 6 | 10 | 15 | 20 | 370 | 335 | 325 | 250 |
| 4 | 5.0–5.5 | 5 | 10 | 16 | 18 | 370 | 333 | 333 | 250 |
| 5 | 4.0–5.0 | 6 | 8 | 12 | 15 | 370 | 333 | 333 | 240 |
| 6 | 3.0–3.5 | 6 | 8 | 12 | 15 | 370 | 333 | 333 | 240 |
| 7 | 4.0–5.0 | 6 | 8 | 12 | 15 | 385 | 334 | 335 | 240 |
| 8 | 10.0–11.0 | 5 | 10 | 12 | 15 | 360 | 350 | 335 | 240 |
| 9 | 11.0–11.5 | 8 | 10 | 12 | 15 | 360 | 350 | 335 | 240 |
| 10 | 10.0–11.5 | 6 | 8 | 12 | 15 | 360 | 350 | 335 | 270 |
| 11 | 3.0–4.5 | 6 | 8 | 12 | 15 | 360 | 350 | 335 | 270 |

These were batch, rather than continuous runs, with some difficulty encountered in maintaining constant roll temperatures. Despite this, release from the calender roll surfaces was excellent in all cases, and the films in the 5–10 mil range had smooth surfaces. Below 5 mils the films tended to be rough on one surface; and above 10 mils sink marks were prevalent in the sheet, indicating cooling problems. As was the case with the two-roll mill tests, color of the films and sheets was poor.

EXAMPLE 1

A lubricant composition was prepared by blending together at room temperature, in the form of fine powders, 65 parts of N,N'-ethylenebis(stearamide), 27 parts of stearic acid, and 8 parts of zinc stearate. When tested by the method of Comparative Example A, it was found to be excellent in roll release, and the polypropylene sheet had excellent color.

EXAMPLE 2

Example 1 was repeated, but 27 parts of lauric acid was substituted for the stearic acid. Equivalent results were obtained.

EXAMPLE 3

Example 1 was repeated, but 8 parts of barium stearate was substituted for the zinc stearate. Roll release was excellent. The color of the sheet was very slightly darker, and was judged to be very good.

EXAMPLES 4–9

Example 1 is repeated, with 27 parts capric, myristic, palmitic, arachidic, behenic, and 12-hydroxystearic acids substituted for the stearic acid. Essentially equal results are obtained.

EXAMPLES 10–12

Example 3 is repeated with 8 parts of calcium stearate, magnesium stearate, and strontium stearate substituted for barium stearate. The results are essentially equal to the results of Example 3.

EXAMPLES 13–15

Example 1 is repeated, with 8 parts of zinc caprate, zinc behenate, and zinc 12-hydroxystearate substituted for zinc stearate. The results are essentially equal to that of Example 1.

EXAMPLES 16 and 17

Example 1 is repeated, but with 60 parts and 70 parts of N,N'-ethylenebis(stearamide) used in place of 65 parts. Essentially equal results are obtained.

EXAMPLES 18 and 19

Example 1 is repeated, but with 22 parts and 32 parts of stearic acid used in place of 27 parts. The results are essentially the same.

EXAMPLES 20 and 21

Example 1 is repeated, but with 3 parts and 13 parts of zinc stearate used in place of 8 parts. The results are essentially the same.

EXAMPLE 22

Example 1 is repeated, but with 65 parts of N,N'-ethylenebis(hydroxystearamide) in place of 65 parts of N,N'-ethylenebis(stearamide). The results are essentially the same.

EXAMPLE 23

Using the lubricant composition of Example 1 and a 92/8 mole ratio propylene/ethylene copolymer resin having a melt flow of 4.0 g/10 min, a density of 0.900 g/cc, and a melting point of 293° F., a film of about 10 mils thickness and a width of 45 inches was calendered on a production-scale four-roll "L" calender.

Mastication was accomplished via a Banbury® mixer, two-roll mill, and extruder-strainer sequence. For each Banbury drop a charge of 125 lb of copolymer resin and 1.20 lb of lubricant was used. The Banbury was heated with steam at a pressure of 25 psi gauge, and the drop temperature was 345° C. The two-roll mill had surface temperatures of 340° F. and 320° C. The extruder pressure was 80 psi, with a screen pack consisting of one 8 mesh screen. The calender roll surface temperatures were maintained at 365° F., 360° F., 375° F., and 380° F. The film was picked off the calender at a rate of 53 ft/min, cooled over cooling cans and wound up. The resin melt on the calender was of excellent quality, with a smooth rolling bank, no air entrapment, no pick marks, and good clarity. The cooled film had smooth surfaces and excellent color.

EXAMPLE 24

Example 23 was repeated, but with a propylene homopolymer resin having a melt flow of 4.0 g/10 min in place of the copolymer resin. With this homopolymer resin more heat was generated on the calender, which had an adverse effect on melt strength, but in all other respects the results were equivalent to those of Example 22. The cooled film had smooth surfaces and excellent color.

EXAMPLE 25

Example 23 was repeated except that the level of lubricant was reduced to 0.60 lb per 125 lb of copolymer resin, and some of the process conditions were slightly modified. The film was calendered at a thickness of 10 mils and a width of 54 inches. The two-roll mill had surface temperatures of 300° F. and 285° F., and the calender roll surface temperatures were maintained at 350° F., 345° F., 365° F., and 360° F. The film was picked off the calender at a rate of 73 ft/min, cooled over cooling cans, and wound up. This run processed satisfactorily throughout its duration of 2½ hours without sticking or burning. The film had smooth surfaces, excellent color, and the following physical properties.

| | |
|---|---|
| Thickness | .0107 in |
| Tensile strength, psi | 5362, machine direction |
| | 4500, transverse direction |
| Elongation, % | 15, machine direction |
| | 15, transverse direction |
| Graves tear strength, lb/in | 1110, machine direction |
| | 1130, transverse direction |
| Gloss, 60° | 74.6, face |
| | 74.0, back |

EXAMPLE 26

The films from Examples 23 and 24 were subjected to thermoforming trials on two types of commercial form fill seal machines: a radiant heat pressure former, and a contact heat venturi vacuum. With both machines, the heating-mold cooling conditions used were essentially those previously established for thermoforming polyvinyl chloride films. Only slight adjustments were required, for reducing heat in order to produce more even distribution of material. Using running speeds of 20 strokes per minute on each machine, parts of acceptable quality were formed from both the copolymer and homopolymer films.

What is claimed is:

1. A lubricant composition for polyolefins which comprises from about 60 to about 70 parts by weight of at least one N,N'-ethylenebis amide of a fatty acid or hydroxy-substituted fatty acid having from about 10 to about 22 carbon atoms, from about 22 to about 32 parts by weight of at least one free fatty acid or hydroxy-substituted fatty acid having from about 10 to about 22 carbon atoms, and from about 3 to about 13 parts by weight of a least one metal salt of at least one fatty acid or hydroxy-substituted fatty acid having from about 10 to about 22 carbon atoms.

2. A lubricant composition according to claim 1 wherein the N,N'-ethylenebis amide is N,N'-ethylenebis(stearamide).

3. A lubricant composition according to claim 1 wherein the free fatty acid is stearic acid.

4. A lubricant composition according to claim 1 wherein the metal salt is a salt of stearic acid.

5. A lubricant composition according to claim 4 wherein the metal salt is barium stearate.

6. A lubricant composition according to claim 4 wherein the metal salt is zinc stearate.

7. A lubricant composition according to claim 1 which comprises about 65 parts by weight of N,N'-ethylenebis(stearamide), about 27 parts by weight of stearic acid, and about 8 parts by weight of zinc stearate.

8. In a polyolefin composition comprising an intimate mixture of at least one polyolefin resin and a lubricant, the amount of said lubricant being from about 0.1 parts by weight to about 5 parts by weight per 100 parts by weight of said polyolefin resin, the improvement wherein said lubricant comprises:
    (a) from about 60 to about 70 parts by weight of at least one N,N'-ethylenebis amide of a fatty acid or hydroxy-substituted fatty acid having from about 10 to about 22 carbon atoms,
    (b) from about 22 to about 32 parts by weight of at least one free fatty acid or hydroxy-substituted fatty acid having from about 10 to about 22 carbon atoms, and
    (c) from about 3 to about 13 parts by weight of at least one metal salt of at least one fatty acid or hydroxy-substituted fatty acid having from about 10 to about 22 carbon atoms.

9. A polyolefin composition according to claim 8 wherein the N,N'-ethylenebis amide is N,N'-ethylenebis(stearamide).

10. A polyolefin composition according to claim 8 wherein the free fatty acid is stearic acid.

11. A polyolefin composition according to claim 8 wherein the metal salt is a salt of stearic acid.

12. A polyolefin composition according to claim 8 wherein the metal salt is barium stearate.

13. A polyolefin composition according to claim 8 wherein the metal salt is zinc stearate.

14. A polyolefin composition according to claim 8 wherein said lubricant comprises N,N'-ethylenebis(stearamide), stearic acid, and zinc stearate in a weight ratio of about 65/27/8.

15. A polyolefin composition according to claim 8 wherein the amount of said lubricant is from about 0.5 parts by weight to about 1 part by weight per 100 parts by weight of said polyolefin resin.

16. A polyolefin composition according to claim 8 wherein said polyolefin resin is a homopolymer of propylene.

17. A polyolefin composition according to claim 8 wherein said polyolefin resin is a copolymer of propylene and at least one other olefin.

18. A polyolefin composition according to claim 17 wherein said copolymer is a copolymer of propylene and ethylene.

19. A polyolefin composition according to claim 18 wherein said copolymer contains from about 3% to about 20% by weight of ethylene mers.

20. In a process for the manufacture of a smooth and uniform film or sheet of a polyolefin composition on a calender which comprises the steps of (a) feeding said polyolefin composition to a calender, all rolls of which are heated to a surface temperature above the crystallite melting point of the polyolefin component of said polyolefin composition, (b) raising the surface temperature of the calender rolls until a smooth rolling bank is formed at each nip and maintaining this temperature as long as said polyolefin composition is passing through the calender, and (c) taking off said film or sheet from the last calender roll and cooling it down to a temperature below its crystallite melting point, the improvement wherein said polyolefin composition comprises an intimate mixture of at least one polyolefin resin and from about 0.1 parts by weight to about 5 parts by weight per 100 parts by weight of polyolefin resin of a lubricant which comprises from about 60 to about 70 parts by weight of at least one N,N'-ethylenebis amide of a fatty acid or hydroxy-substituted fatty having from about 10 to about 22 carbon atoms, from about 22 to about 32 parts by weight of at least one free fatty acid or hydroxy-substituted fatty acid having from about 10 to about 22 carbon atoms, and from about 3 to about 13 parts by weight of at least one metal salt of at least one fatty acid or hydroxy-substituted fatty acid having from about 10 to about 22 carbon atoms.

21. A process according to claim 20 wherein said N,N'-ethylenebis amide is N,N'-ethylenebis(stearamide).

22. A process according to claim 20 wherein said free fatty acid is stearic acid.

23. A process according to claim 20 wherein said metal salt is a salt of stearic acid.

24. A process according to claim 20 wherein said metal salt is barium stearate.

25. A process according to claim 20 wherein said metal salt is zinc stearate.

26. A process according to claim 20 wherein said lubricant comprises N,N'-ethylenebis(stearamide), stearic acid, and zinc stearate in a weight ratio of about 65/27/8.

27. A process according to claim 20 wherein said polyolefin resin is a homopolymer of propylene.

28. A process according to claim 20 wherein said polyolefin resin is a copolymer of propylene and at least one other olefin.

29. A process according to claim 28 wherein said polyolefin resin is a copolymer of propylene and ethylene.

30. A process according to claim 29 wherein said copolymer contains from about 3% to about 20% by weight of ethylene mers.

* * * * *